United States Patent
Magee et al.

(10) Patent No.: US 9,401,856 B2
(45) Date of Patent: Jul. 26, 2016

(54) LATENCY MONITORING FUNCTION

(71) Applicant: ADVA Optical Networking SE, Martinsried (DE)

(72) Inventors: Anthony Magee, South Milford (GB); Peter Turnbull, Knaresborough (GB)

(73) Assignee: ADVA Optical Networking SE, Martinsried (DE)

( * ) Notice: Subject to any disclaimer, the term of this patent is extended or adjusted under 35 U.S.C. 154(b) by 0 days.

(21) Appl. No.: 13/762,748

(22) Filed: Feb. 8, 2013

(65) Prior Publication Data
US 2014/0149526 A1     May 29, 2014

(51) Int. Cl.
*H04L 12/26* (2006.01)
*H04J 3/06* (2006.01)

(52) U.S. Cl.
CPC ........... *H04L 43/0852* (2013.01); *H04J 3/0667* (2013.01); *H04J 3/0673* (2013.01); *H04L 43/0858* (2013.01); *H04L 43/0864* (2013.01)

(58) Field of Classification Search
CPC .............. H04L 29/08072; H04L 29/06; H04L 29/08981; H04L 12/403; H04L 12/2803
See application file for complete search history.

(56) References Cited

U.S. PATENT DOCUMENTS

| | | | |
|---|---|---|---|
| 7,787,438 B2 | 8/2010 | Dowse | |
| 2008/0226004 A1* | 9/2008 | Oh | 375/358 |
| 2009/0296795 A1* | 12/2009 | Lindqvist et al. | 375/224 |

FOREIGN PATENT DOCUMENTS

| | | | |
|---|---|---|---|
| WO | 2011063167 A1 | 5/2011 | |
| WO | WO 2011063167 A1 * | 5/2011 | |

OTHER PUBLICATIONS

O'Hara, Mike, "Why Network Timing Accuracy is Increasingly Important in Electronic Markets," an interview with Charles Berry of Juniper Networks, Oct. 31, 2011, HFT Review Ltd (7 pages).
European Search Report in corresponding European patent application No. 12194426.8 mailed May 24, 2013 (9 pages).

* cited by examiner

*Primary Examiner* — Vivek Srivastava
*Assistant Examiner* — Hien Doan
(74) *Attorney, Agent, or Firm* — Maginot, Moore & Beck LLP (57) ABSTRACT

A network comprising a latency monitoring point adapted to calculate a forward latency of a path between a master node and a slave node on the basis of time stamps which are exchanged periodically between said master node and said slave node by a time alignment protocol used in said network.

15 Claims, 5 Drawing Sheets

LATENCY MONITORING FUNCTION

This application claims priority under 35 U.S.C. §119 to European patent application no. 12 194 426.8, filed on Nov. 27, 2012, the disclosure of which is incorporated herein by reference in its entirety.

BACKGROUND

The invention relates to a latency monitoring point for a network to provide a latency measurement function that enables a measurement of latency in a packet network.

Conventional methods for measuring latency in a packet network range from crude methods such as ICMP Ping to more advanced measurement methods such as delay measurements using Carrier Ethernet tools like ITU-T Y.1731.

These conventional methods need an instance of the protocol to be supported on each side of the signal path which is monitored. Furthermore, the conventional methods also need access to a time source on the device in which the monitoring function and protocol is supported. Conventional methods provided for measurement of latency in the packet network do inject test traffic into the data path which is being measured, thus potentially adding to the latency of the data traffic which normally traverses the data path when a packet is ready to send and a test packet transmission is in progress.

U.S. Pat. No. 7,787,438 B2 describes a method of using two or more round trip measurements between a first and a second node in a network to estimate a delay parameter in traffic between a first and a second node. The method of U.S. Pat. No. 7,787,438 B2 applies the same principles as the methods described above such as ICMP PING or for instance Y.1731 in that a packet is inserted into the stream and an operation is performed at the receiving node. Therefore, this method also incurs a delay for other traffic. The passive monitoring described in this US patent requires two or more monitoring systems. The incurring of further delay into the data traffic can be critical in high frequency services such as high frequency trading HFT services. Further, the additional delay caused by the latency monitoring can become critical for real time applications, in particular when security is involved. Accordingly, it is an object to provide an apparatus and a method which enable an accurate latency monitoring in a packet network avoiding latency generation when monitoring the latency.

SUMMARY

Accordingly, in a first aspect of the present invention a network comprising an intermediate latency monitoring point is provided adapted to calculate a forward latency of a path between a master node and a slave node on the basis of time stamps which are exchanged periodically between the master node and a slave node by a time alignment protocol used in said network.

In a possible embodiment of the network according to the present invention the alignment protocol used in said network comprises a time of day protocol In a possible embodiment of the network according to the present invention the time alignment protocol used in said network comprises as a time of day protocol a precision time protocol PTP.

In an alternative embodiment of the network according to the present invention said time the time alignment protocol used by said network comprises as a time of day protocol a network time protocol NTP.

In a possible embodiment of the network according to the present invention the intermediate latency monitoring point is adapted to copy synchronization messages of said time alignment protocol which are exchanged periodically between the master node and the slave node to synchronize a slave clock of said slave node with a master clock of said master node and said synchronization messages pass through said intermediate latency monitoring point wherein said intermediate latency monitoring point LMP is further adapted to extract the time stamps from the copied synchronization messages.

In a possible embodiment of the network according to the present invention the intermediate latency monitoring point comprises a LMP clock providing a LMP time.

In a possible embodiment of the network according to the present invention the intermediate latency monitoring point comprises a calculation unit adapted to calculate the forward latency of said path between said master node and said slave node by subtracting the LMP time stamp when a delay request message of said time alignment protocol is received by said intermediate latency monitoring point from said slave node on its way towards the master node from a slave time stamp when said delay request message has been sent by said slave node towards said master node.

In a further possible embodiment of the network according to the present invention the LMP time stamp is provided by said LMP clock of said intermediate latency monitoring point.

In a still further possible embodiment of the network according to the present invention the slave time stamp is extracted by said intermediate latency monitoring point from a copy of said delay request message passing through said intermediate latency monitoring point on its way towards the master node.

In a further possible embodiment of the network according to the present invention the LMP clock of the intermediate latency monitoring point is syntonized with the master clock of said master node.

In a still further possible embodiment of the network according to the present invention the intermediate latency monitoring point comprises a data memory unit adapted to store the forward latencies calculated by said calculation unit of said intermediate latency monitoring point on the basis of the time stamps.

In a still further possible embodiment of the network according to the present invention the intermediate latency monitoring point is adapted to provide a managed entity of a management administrator with the calculated forward latencies via a sideband management channel of the network or by means of a separate out of band interface.

In a still further possible embodiment of the network according to the present invention the intermediate latency monitoring point is integrated in a pluggable transceiver plugged into the slave node.

In a still further possible embodiment of the network according to the present invention the intermediate latency monitoring point is integrated in a fan-out-switch.

Accordingly, the invention provides a method for monitoring latency in a network, wherein time stamps which are exchanged periodically between a master node and a slave node by a time alignment protocol used in said network are observed by an intermediate latency monitoring point to calculate a latency of a path between said master node and said slave node.

In a possible embodiment of the network according to the present invention the time stamps are extracted from copied synchronization messages of said time alignment protocol exchanged periodically between the master node and the slave node to synchronize a slave clock of said slave node with a master clock of said master node.

In a possible embodiment of the network according to the present invention the forward latency of said path is calculated by subtracting the LMP time stamp according to a LMP clock of said intermediate latency monitoring point when a delay request message of said time alignment protocol is received by said intermediate latency monitoring point from said slave node on its way towards the master node from a slave time stamp when said delay request message has been sent by said slave node towards said master node.

According to this third aspect the invention provides an intermediate latency monitoring point of a network comprising a calculation unit adapted to calculate a forward latency of a path between a master node and a slave node on the basis of time stamps which are exchanged periodically between said master node and said slave node by a time alignment protocol used in said network.

Accordingly, the invention further provides a trading network of a high frequency trading service provider comprising an intermediate latency monitoring point, wherein said intermediate latency monitoring point comprises a calculation unit adapted to calculate a forward latency of a path between a master node and a slave node of a service customer on the basis of time stamps which are exchanged periodically between the master node and the slave node by a time alignment protocol used in said network.

The invention further provides a pluggable device adapted to be plugged in a slave node, wherein said pluggable device comprises an intermediate latency monitoring point, wherein said intermediate latency monitoring point comprises a calculation unit adapted to calculate a forward latency of the path between a master node and a slave node on the basis of time stamps which are exchanged periodically between the master node and the slave node by a time alignment protocol used in said network.

BRIEF DESCRIPTION OF THE DRAWINGS

In the following possible embodiments of the method and apparatus according to the present invention are described in more detail with reference to the enclosed figures.

DETAILED DESCRIPTION

Figure 1:
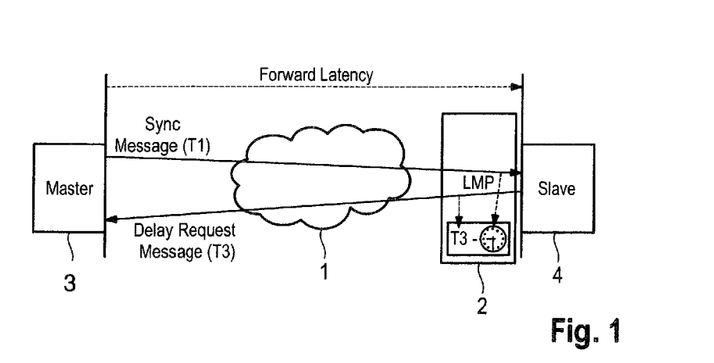
FIG. 1 shows a diagram illustrating a possible embodiment of a network comprising a latency monitoring point of a service provider according to the present invention.

As can be seen from FIG. 1 showing a possible embodiment of a network 1 comprising an intermediate latency monitoring point 2. The latency monitoring point 2 is adapted to calculate a forward latency of a path between a master node 3 and a slave node 4. The intermediate latency monitoring point 2 is adapted to calculate the forward latency of the path between the master node 3 and the slave node 4 on the basis of time stamps or time tags which are exchanged periodically between the master node 3 and the slave node 4 by a time alignment protocol in particular a time of day protocol used in the network 1. The network 1 is in a preferred embodiment a packet network where data packets are exchanged between nodes of the network 1.

In a possible embodiment the time of day protocol used in the network 1 is a precision time protocol PTP. The precision time protocol PTP comprises synchronization messages used between a master and slave node. The master node is the provider of time, whereas the slave node synchronizes itself to the master node. The synchronization messages comprise master sync messages, master delay response messages and slave clock delay request messages. Four time stamps can be captured between the master and slave clock. The time stamps are commonly referred to as T1, T2, T3 and T4. The first time stamp T1 is the precise time when the sync message is sent from the master node. The second time stamp is T2. This time stamp T2 is the precise time of the sync message as it is received at the slave node. The third time stamp T3 is the precise time of a delay request message sent from the slave node. The fourth time stamp T4 is the precise time of the delay request message when it is received at the master node.

In an alternative embodiment the time of day protocol used in the network is the network time protocol NTP. The network time protocol NTP is the network protocol for clock synchronization between nodes over a packet-switched variable latency data network. The NTP protocol uses also time stamps for synchronization.

The network 1 according to the present invention as shown in the implementation of FIG. 1 comprises at least one intermediate latency monitoring point 2 which is adapted to copy synchronization messages of said time alignment protocol used in the network 1, wherein the time alignment protocol can be a time of day protocol for example a precision time protocol PTP or a network time protocol NTP. The synchronization messages are exchanged periodically between the master node 3 and the slave node 4 to synchronize a slave clock of the slave node 4 with the master clock of the master node 3. The synchronization messages pass through the intermediate latency monitoring point 2. The latency monitoring point 2 is adapted to extract the time stamps from the copied synchronization messages. The intermediate latency monitoring point 2 comprises a passive packet monitoring facility which can monitor time stamps within the time alignment protocols such as time of day protocols including IEEE 1588 PTP and NTP. By observing the time stamps which are exchanged on a periodic basis by such time alignment protocols the latency monitoring function of the intermediate latency monitoring point 2 uses the time alignment protocol itself to calculate the latency of the path. The intermediate latency monitoring point 2 as shown in FIG. 1 comprises a calculation unit adapted to calculate the forward latency of the path between the master node 3 and the slave node 4 by subtracting the LMP time stamp T3' when a delay request message of said time of day protocol is received by the latency monitoring point 2 from said slave node 4 on its way towards the master node 3 from a slave time stamp T3 when said delay request message has been sent by said slave node 4 towards said master node 3. The LMP time stamp T3' is provided by the LMP clock of the latency monitoring point 2. The slave time stamp T3 is extracted by the intermediate latency monitoring point 2 from a copy of said delay request message passing through said intermediate latency monitoring point 2 on its way towards the master node 3. Accordingly, the LMP clock of the intermediate latency monitoring point 2 is syntonized with the master clock of the master node 3.

In the network 1 according to the present invention the aim of the slave clock of the slave node 4 is to align itself accurately to the master clock within some tolerance, and thus the slave time does converge towards the master time. The slave clock does this based on the assumption that the delay between the master node 3 and the slave node 4 and between the slave node 4 and the master node 3, respectively, is symmetrical. The slave clock of the slave 4 does place a time stamp T3 into to the outgoing delay request message wherein this time stamp T3 is an accurate reflection of the time within the slave clock of the slave node 4.

By evaluating the time stamp T1 generated by the master clock of the master node 3 the time for the latency monitoring function LMF can be derived referred to as the LMP time. The LMP time is an estimate of the master time subject to an unknown term which is equal in magnitude to the latency in the forward path between the master node 3 and the slave node 4, and more specifically behind the master time:

LMP time=master time−forward latency

For the purpose of this latency monitoring function, the latency monitoring function rate syntonizes to the master such that the variable LMP time is incremented at the same rate as the master time of the master node 3. The slave time aims to converge on the master time and when the path delay is asymmetric, it can be stated that the slave time will be offset from the LMP time by the forward latency.

Thus, using LMP time to sample the delay request message coming from the slave node 4 on its way to the master node 3 with a time stamp T3 present in the data packet inserted by the slave node 4, a time stamp T3' can be recorded by the intermediate latency monitoring point LMP as a snapshot of the LMP time at that instant.

In a preferred embodiment the latency monitoring point LMP 2 is located close to the slave node 4. In this scenario the delay between the slave node 4 and the latency monitoring point LMP 2 providing the latency monitoring function LMF can be assumed to be negligible. Accordingly, the time stamp T3 generated by the slave node 4 differs from the latency monitoring function generated time stamp T3' by the forward latency of the path between the master node 3 and the slave node 4. Consequently, in a preferred embodiment a comparison of the time stamp T3 generated by the slave node 4 and the time stamp T3' generated by the latency monitoring function LMF of the intermediate latency monitoring point 2 may be used to calculate the forward latency of the path between the master node 3 and the slave node 4 as follows:

Forward latency=$T3-T3'$

In a possible embodiment the intermediate latency monitoring point 2 comprises a calculation unit adapted to calculate the forward latency of the path between the master node 3 and the slave node 4 by subtracting the LMP time stamp T3' when a delay request message of the time of day protocol is received by the latency monitoring point 2 coming from the slave node 4 on its way towards the master node 3 from the slave time stamp T3 indicating when the delay request message has been sent by the slave node 4 towards the master node 3. The LMP time stamp T3' is provided by the LMP clock of the intermediate latency monitoring point 2.

In a possible embodiment the slave time stamp T3 can be extracted by the intermediate latency monitoring point 2 from a copy of the delay request message passing through the intermediate latency monitoring point 2 on its way towards the master node 3.

In a further possible embodiment the intermediate latency monitoring point 2 in the network 1 comprises a data memory unit adapted to store the forward latencies calculated by the calculation unit of the intermediate latency monitoring point 2 on the basis of the time stamps.

In a possible embodiment the intermediate latency monitoring point 2 of the network 1 is adapted to provide a managed entity of a management administrator such as a service provider with the calculated forward latencies via a sideband management channel of the network 1. This sideband management channel can be formed by an embedded communication channel ECC. In an alternative embodiment the sideband management channel can be formed by an out-of-band signal channel.

Figure 2:
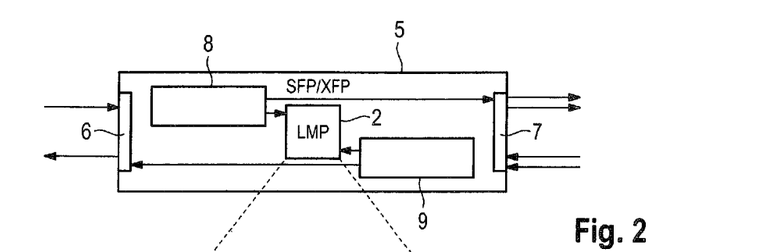
FIG. 2 shows a diagram for illustrating a possible embodiment for a latency monitoring point according to the present invention embedded in a pluggable device.

In a possible embodiment the latency monitoring point 2 can be integrated in a pluggable transceiver (SFP/XFP) 5 as illustrated in FIG. 2. This pluggable transceiver 5 can be plugged into a slave node 4 of a service customer. In a possible implementation the pluggable transceiver 5 can comprise an interface 6 and a host electrical interface 7 with differential pairs. The interface 6 can in a possible implementation be a optical fiber interface. In an alternative implementation the interface 6 can be an electrical line interface. The host electrical interface 7 can be used to connect the pluggable latency monitoring point 2 integrated in the pluggable transceiver 5 with a host device 4. By means of the interface 6 the pluggable transceiver 5 can be connected to an network in which data packets are transported between the master node 3 and the slave node 4. This network is in a preferred embodiment an optical network. As illustrated in FIG. 2 the pluggable transceiver 5 can comprise copy units 8, 9 which are adapted to copy synchronization messages of the time alignment protocol in particular the time of day protocol used in the network 1. Accordingly, the intermediate latency monitoring point 2 integrated in the pluggable transceiver 5 receives copies of the transported synchronization messages of the time alignment protocol and can extract time stamps of the copied synchronization messages. The extracted time stamps can be supplied to the intermediate latency monitoring point 2 as shown in FIG. 2.

Figure 3:
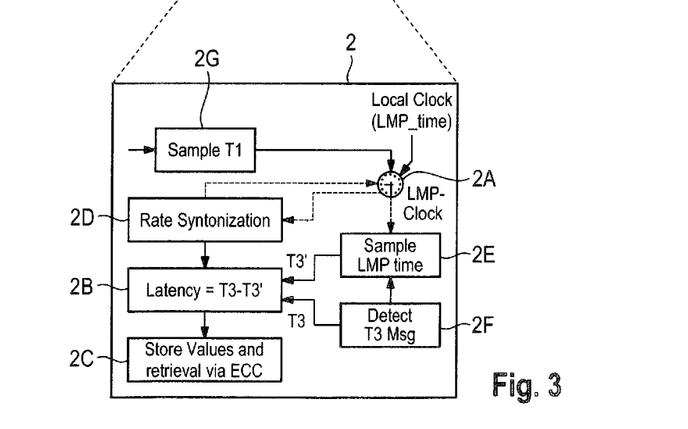
FIG. 3 shows a block diagram for illustrating the operation of the latency monitoring point LMP in a network according to the present invention.

FIG. 3 illustrates an implementation of a latency monitoring function LMF in the intermediate latency monitoring point 2 which can be integrated in the pluggable transceiver 5 as illustrated in FIG. 2. The latency monitoring function LMF provided by the latency monitoring point 2 provides a method for monitoring latency in the network 1. Time stamps are exchanged within synchronization messages transmitted periodically between the master node 3 and a slave node 4 according to the employed time alignment protocol in particular time of day protocol used in the network 1. The time stamps are obtained by the latency monitoring point 2 to calculate the latency of the path between the master node 3 and the slave node 4. As shown in FIG. 3 the latency monitoring point 2 comprises an LMP clock 2A providing an LMP time. The LMP time is offset from the master time by the forward delay/forward latency. The latency monitoring point 2 further comprises a calculation unit 2B which is adapted to calculate the forward latency of the path between the master node 3 and the slave node 4 by subtracting the LMP time stamp T3' when a delay request message of the time of day protocol is received by the latency monitoring point 2 from the slave node 4 on its way towards the master node 3 from the slave time stamp T3 transported in the data packet indicating when the delay request message has been sent by the slave node 4 towards the master node 3. When the time stamp T3 is extracted from the received message the forward latency is calculated by the calculation unit 2B by subtracting the LMP time stamp T3' according to the LMP clock from the detected time stamp T3. As illustrated in FIG. 3 the forward latencies calculated by the calculation unit 2B are stored in a data memory 2C of the latency monitoring point 2 for data retrieval via a sideband management channel of the network 1. As also illustrated in FIG. 3, the LMP clock 2A of the latency monitoring point 2 is syntonized with the master clock of the master node 3. Accordingly, the latency monitoring function rate syntonizes to the master clock such that the variable LMP time is incremented at the same rate as the master time of the master clock within the master node 3. The rate syntonization can be performed by a rate syntonization unit 2D as illustrated in FIG. 3. A sample of the LMP time T3' can be provided by a sample unit 2E as illustrated in FIG. 3. Further, the detection of the time stamp T3 within the synchronization message received from the slave node 4 can be performed by a detection unit 2F of the latency monitoring point 2. In a possible embodiment the sample unit 2E as well as the detection unit 2F can be connected to the calculation unit 2B which calculates the latency on the basis of the sample LMP time T3' and the extracted time stamp T3. For the purpose of rate syntonization a sample of the time stamp T1 provided by the master node 3 can be extracted by a sample unit 2G of the latency monitoring point 2.

Figure 4:
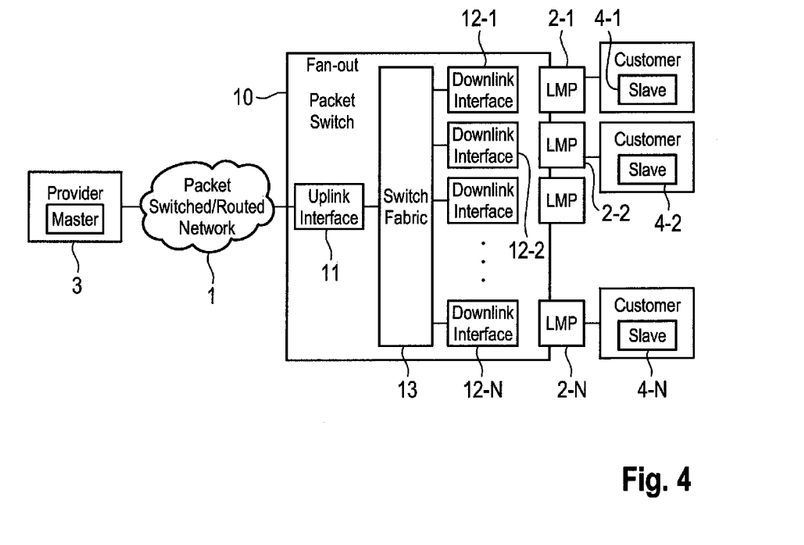
FIG. 4 shows a diagram for illustrating a possible embodiment of the latency monitoring point according to the present invention integrated in a fan-out-switch.

In a still further possible embodiment of the network according to the present invention the latency monitoring point 2 can be integrated in a fan-out-switch 10 as illustrated in FIG. 4. Each slave node 4-$i$ of a customer can be connected to a corresponding latency monitoring point 2-$i$ for example via a short optical fiber interconnect. The demarcation fan-out packet switch 10 of the management administrator comprises an uplink interface 11 which is connected to the network 1 that is formed by a packet switched/routed network. The master node 3 is also connected to this packet switched/routed network 1 as illustrated in FIG. 4. The fan-out packet switch 10 of the management administrator such as a service provider comprises downlink interfaces 12-1, 12-2, . . . 12 for each of the latency monitoring points 2-$i$ of the different slave nodes 4-$i$. The uplink interface 11 and the downlink interfaces 12-$i$ of the fan-out packet switch 10 are connected to each other via a switch fabric 13 of the fan-out packet switch 10. The management administrator's demarcation switch 10 is provided in a preferred implementation of the network close to the slave nodes 4-$i$ of the different customers. These slave nodes 4-$i$ are connected to the latency monitoring points 2-$i$ being linked to the downlink interfaces 12-$i$ of the fan-out packet switch 10 via short fiber interconnects as illustrated in FIG. 4.

Each latency monitoring point LMP 2-$i$ connected to the fan-out packet switch 10 is adapted to calculate a forward latency of a path between the master node 3 and a corresponding slave node 4-$i$ such as a node of a service customer on the basis of time stamps which are exchanged periodically between the master node 3 and the respective slave node 4-$i$ by the time alignment protocol used in the network 1. The calculated forward latencies in each latency monitoring point 2-$i$ can be stored in a corresponding data memory unit of the latency monitoring point 2-$i$. These stored latencies can be retrieved by the management administrator such as a service provider in a possible embodiment via a sideband management channel such as an embedded communication channel, ECC. In an alternative embodiment these latency results can be retrieved by the management administrator out-of-band from the data. This alternative embodiment has the advantage that it does not have an impact on the latency of the customer data traffic in the network. The retrieved latency results can be used for checking whether a management administrator such as a service provider does fulfil the requirements of a service level agreement SLA.

Figure 5:
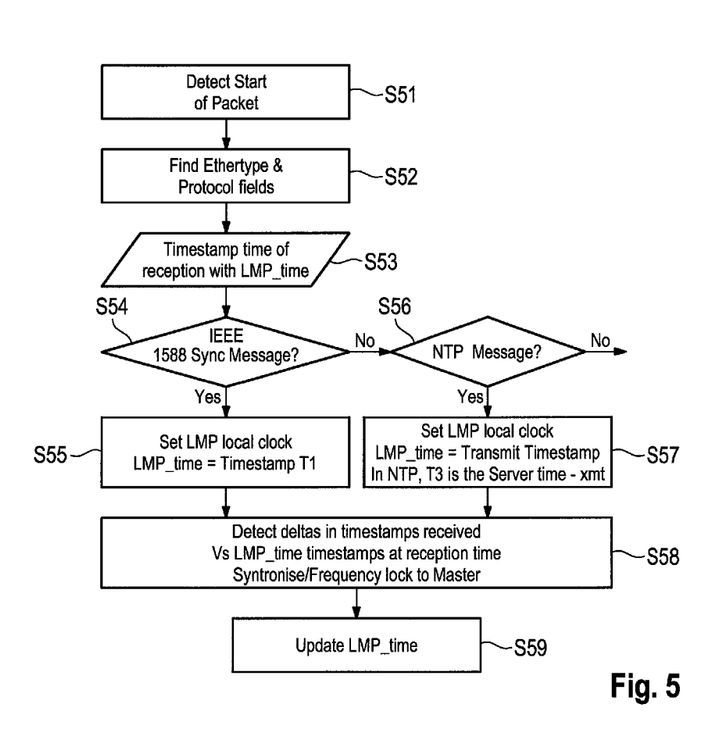
FIG. 5 shows a flow chart of a possible implementation of a method for monitoring latency in a network according to the present invention.

FIG. 5 shows a flow chart of a possible implementation of the LMP process at the master interface of the latency monitoring point 2.

In a first step S5-1 a start of a data packet is detected.

In a second step S5-2 Ethertype and protocol fields of the received data packet are searched and extracted.

In a further step S5-3 the timestamp time of reception with local LMP time is generated.

In a further step S5-4 it is decided whether the received message is a IEEE 1588 synchronization message or not. If the received message is a IEEE 1588 synchronization message, the LMP local clock is set according to: LMP time=time stamp T1 in step S5-5.

If the received message is not a IEEE 1588 synchronization message, it is checked in step S5-6, whether the synchronization message is an NTP message. If the received message is an NTP message, the LMP local clock is set according to: LMP time=transmit timestamp in step S5-7. In the network time protocol NTP time stamp T3 is the server time-xmt.

In a further step S5-8 deltas or differences in the time stamps are detected: LMP time–time stamps at reception time. Further the syntonization and/or frequency lock to the master clock is performed.

In a final step S5-9 the LMP time is updated.

Figure 6:
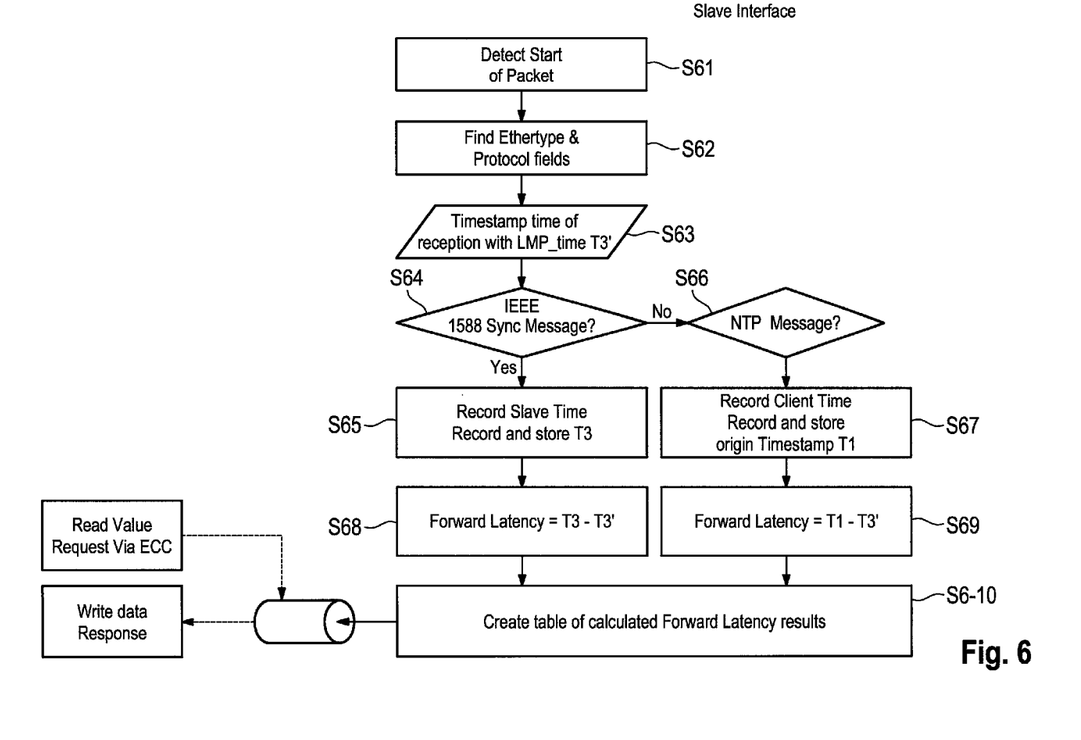
FIG. 6 shows a further flow chart for illustrating a possible implementation of a method for monitoring latency in a network according to the present invention.

FIG. 6 shows a further flow chart for illustrating an LMP process according to the present invention at a slave interface of the latency monitoring point 2.

At the slave interface of the latency monitoring point 2 connecting the latency monitoring point 2 with the slave node 4 in a first step S6-1 start of a received data packet is detected.

In a further step S6-2 the Ethertype and protocol fields of the received detected data packet are extracted.

Then, in a further step S6-3 the time stamp time of the reception of the data packet with local LMP time is generated as time stamp T3'.

In a further step S6-4 it is checked whether the received message is a IEEE 1588 synchronization message or not. If the received message is a IEEE 1588 synchronization message, the slave time is recorded in step S6-5 and is stored as time stamp T3. If the received message is not a IEEE 1588 synchronization message it is checked in step S6-6, if the received message is an NTP message or not. If the received message is a network time protocol NTP message, the client time is recorded in step S6-7 and the origin time stamp T1 is stored.

After recording the time stamp T3 in step S6-5, the forward latency is calculated by the calculation unit of the latency monitoring point 2 in step S6-8 as follows:

Forward latency=$T3-T3'$

After recording the client time and storing the origin time stamp T1, the calculation unit of the latency monitoring point 2 calculates a forward latency in step S6-9 as follows:

Forward latency=$T1-T3'$

In a further possible step S6-10 a table of the calculated forward latency results can be created and stored in a data memory unit of the latency monitoring point 2 for retrieval. The calculated latencies can be forwarded to a management device of a service provider via a sideband management channel of the network. This sideband management channel can be formed in a possible embodiment by an embedded communication channel ECC. In this embodiment the latency monitoring point 2 can read a value request via the embedded communication channel ECC and write a data response including the stored latency results via the embedded communication channel ECC back to the management device of the service provider as illustrated in FIG. 6.

In a possible application the service provider can provide a high frequency trading service, for example in a financial market. Further, it is possible that the service provider provides a high frequency service, in particular a real time service in a security environment.

The method and device according to the present invention does allow to perform a measurement of latency in a packet network without incurring any latency due to the act of measuring the latency. Accordingly, the method and apparatus according to the present invention minimizes the complexity and interaction of the nodes within the network 1, thus preserving their resources for time critical tasks. According by the present invention, can be used for low latency applications such as financial trading or remote surgical imaging. The method and apparatus according to the present invention can be used for any applications where latency monitoring is necessary to align internal clocks. The method according to the present invention does passively monitor the time alignment protocol messages used by the network 1 and does calculate latency and/or delay measurement from information carried in data packets or messages used by the respective time of day protocol. The latency monitoring function LMF provided by the latency monitoring point 2 according to the present invention does only require a measurement at one monitoring point which is located in a preferred embodiment close to the slave node 4. The latency monitoring function LMF provided by the latency monitoring point 2 according to the present invention does not need to inject latency measurement packets into the path. The latency monitoring function LMF can be deployed without having to be implemented or managed by a node or device provided in the normal data packet path and can be placed in a possible embodiment as a standalone test device. In an alternative embodiment the latency monitoring function LMF can be implemented in a latency monitoring point 2. This intermediate latency monitoring point 2 can be integrated in a possible implementation in a pluggable transceiver acting as a managed demarcation monitoring device of a management administrator. The method and apparatus according to the present does avoid latency generation in the very act of monitoring the respective latency in the data path of the network. Moreover, the method and apparatus according to the present invention does make use of the time of alignment protocol in particular the time of day protocol already implemented in the network. The latency monitoring function LMF provided by the latency monitoring point 2 according to the present invention does not become part of the time alignment protocol infrastructure and thus avoids additional latency. Therefore, the method and apparatus according to the present invention does not add to time of day error accumulation and does not add any packet jitter or unknown offsets. In a possible embodiment the latency monitoring point 2 can provide a latency monitoring function LMF which can be placed in a smart SFP pluggable device. Alternatively, it can be placed in a syncprobe. In a further possible embodiment the latency monitoring function LMF can be placed in a fan-out switch of a high frequency trading HFT environment.

Figure 7:
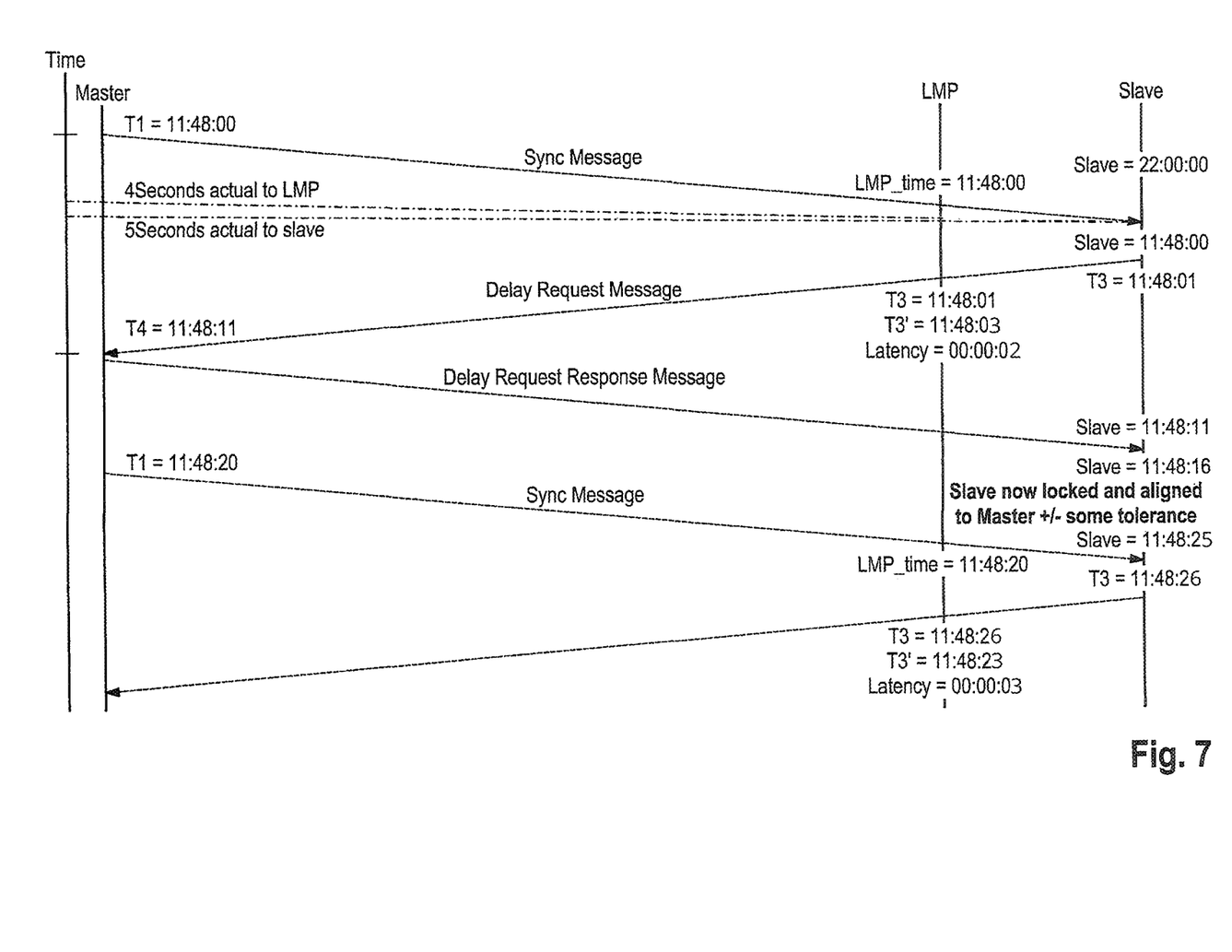
FIG. 7 shows a time diagram for illustrating a specific exemplary implementation of a method for monitoring latency in a network according to the present invention.

FIG. 7 shows a signal diagram illustrating a exemplary communication between a master node 3 and a slave node 4 via a latency monitoring point 2 in a specific exemplary example. The master node 3 sends at a time T1 a synchronization message to a slave node 4. At time T3 a delay request message is sent by the slave node 4 towards the master node 3. The master node 3 sends then a delay request response message to the slave node 4 and sends a synchronization follow-up message as shown in FIG. 7. The time protocol used in the example of FIG. 7 is based on the precision time protocol PTP as defined in IEEE 1588 standard.

What is claimed is:

1. A network, comprising:
a computer processor, a memory,
an intermediate latency monitoring point of a service provider,
a master node and a slave node,
said latency monitoring point comprising an Latency Monitoring Point (LMP) clock, said LMP clock providing a LMP time stamp,
said intermediate latency monitoring point adapted to
calculate a mean latency of a path between said master node and said slave node on a basis of time stamps or time tags which are exchanged periodically between said master node and said slave node using a time of day protocol in said network, wherein said intermediate latency monitoring point comprises
a calculation unit adapted to
calculate the mean latency of said path between said master node and said slave node
by subtracting the LMP time stamp
when a delay request message of a time of day protocol is received by said intermediate latency monitoring point from said slave node on its way towards the master node
from a slave time stamp
when said delay request message has been sent by said slave node towards said master node,
wherein the slave time stamp is extracted by the intermediate latency monitoring point from a copy of said delay request message passing through said intermediate latency monitoring point on its way towards the master node, and
wherein said intermediate latency monitoring point is adapted to copy synchronization messages of said time alignment protocol which are exchanged periodically between the master node and said slave node to synchronize a slave clock of said slave node with a master clock of said master node and pass through said intermediate latency monitoring point and is adapted to extract the time stamps from said copied synchronization messages.

2. The network according to claim 1,
wherein said time of day protocol comprises
a precision time protocol PTP, or
a network time protocol NTP.

3. The network according to claim 1,
wherein said intermediate latency monitoring point further includes a Latency Monitoring Point (LMP) clock providing a Latency Monitoring Point (LMP) time.

4. The network according to claim 3,
wherein a LMP time stamp is provided by said LMP clock of said intermediate latency monitoring point.

5. The network according to claim 1,
wherein said slave time stamp is extracted by said latency monitoring point from a copy of said delay request message passing through said intermediate latency monitoring point on its way towards the master node.

6. The network according to claim 1,
wherein a LMP clock of said intermediate latency monitoring point is synchronized with the master clock of said master node.

7. The network according to claim 1,
wherein said intermediate latency monitoring point further includes a data memory unit adapted to store mean latencies calculated by said calculation unit of said intermediate latency monitoring point on the a basis of the time stamps.

8. The network according to claim 1,
wherein said intermediate latency monitoring point is adapted to provide a management device of said service provider with calculated mean latencies via a sideband management channel of said network.

9. The network according to claim 1,
wherein said intermediate latency monitoring point is integrated in a pluggable transceiver plugged into said slave node.

10. The network according to claim 1,
wherein said intermediate latency monitoring point is connected to a fan-out-switch.

11. A method for monitoring latency in a network, said network comprising a computer processor and a memory,
wherein time stamps which are exchanged periodically between a master node and a slave node by a time of day protocol used in said network are observed by a latency monitoring point to calculate a mean latency of a path between said master node and said slave node,
said latency monitoring point comprising an Latency Monitoring Point (LMP) clock, said LMP clock providing a LMP time stamp, and
wherein the mean latency of said path is calculated by subtracting a Latency Monitoring Point time stamp according to a Latency Monitoring Point clock of said latency monitoring point when a delay request message of said time of day protocol is received by said intermediate latency monitoring point from said slave node on its way towards the master node from a slave time stamp when said delay request message has been sent by said slave node towards said master node, and
wherein the slave time stamp is extracted by the intermediate latency monitoring point from a copy of said delay request message passim through said intermediate latency monitoring point on its way towards the master node, and
wherein said intermediate latency monitoring point is adapted to copy synchronization messages of said time alignment protocol which are exchanged periodically between the master node and said slave node to synchronize a slave clock of said slave node with a master clock of said master node and pass through said intermediate latency monitoring point and is adapted to extract the time stamps from said copied synchronization messages.

12. The method according to claim 11,
wherein the time stamps are extracted from copied synchronization messages of said time alignment protocol exchanged periodically between the master node and the slave node to synchronize a slave clock of said slave node with a master clock of said master node.

13. A latency monitoring point of a network, said network comprising a computer processor and a memory, comprising:
a calculation unit adapted to calculate a mean latency of a path between a master node and a slave node of said network on a basis of time stamps which are exchanged periodically between said master node and said slave node using a time of day protocol in said network,
wherein the mean latency of said path is calculated by subtracting a Latency Monitoring Point time stamp according to a Latency Monitoring Point clock of said latency monitoring point when a delay request message of said time alignment protocol is received by said latency monitoring point from said slave node on its way towards the master node from a slave time stamp when said delay request message has been sent by said slave node towards said master node,
said latency monitoring point comprising an Latency Monitoring Point (LMP) clock, said LMP clock providing a LMP time stamp,
wherein the slave time stamp is extracted by the intermediate latency monitoring point from a copy of said delay request message passing through said intermediate latency monitoring point on its way towards the master node, and
a data memory unit for storing the mean latency calculated by said calculation unit, and
wherein said intermediate latency monitoring point is adapted to copy synchronization messages of said time alignment protocol which are exchanged periodically between the master node and said slave node to synchronize a slave clock of said slave node with a master clock of said master node and pass through said intermediate latency monitoring point and is adapted to extract the time stamps from said copied synchronization messages.

14. The latency monitoring point of claim 13, wherein the latency monitoring point is included in a trading network of a high frequency trading service provider.

15. The latency monitoring point of claim 13, wherein the latency monitoring point is included in a pluggable device adapted to be plugged in a slave node.

* * * * *